Patented Mar. 20, 1945

2,371,736

UNITED STATES PATENT OFFICE 2,371,736

CYCLIZED RUBBERS

Clarence M. Carson, Cuyahoga Falls, Ohio, assignor to Wingfoot Corporation, Akron, Ohio, a corporation of Delaware No Drawing. Application August 8, 1942,
Serial No. 454,124

6 Claims. (Cl. 260—734)

This invention relates to improved cyclized rubber compositions. The compositions contain a stabilizer which is the amide of a carboxylic acid and a polyalkylene polyamine. Although the improved cyclized rubber compositions may be used for molding and for painting, etc., they have particular value as moisture-proofing compositions for paper and other wrapping materials.

Many of the packaging machines now in commercial use depend upon heat and pressure for sealing the packages. Heat-sealable wrapping materials are, therefore, in demand. It has been recognized that cyclized rubbers are useful ingredients in moisture-proofing compositions, and they are heat-sealable although it has been found that these cyclized rubbers lose their heat-sealing properties on aging. Apparently, the oxygen of the atmosphere attacks the cyclized rubber when a sheet coated with a composition containing it is stored, and the cyclized rubber becomes more difficult to heat seal. When a seal formed by uniting two of the coated surfaces with heat and pressure is stored, the seal gradually weakens.

According to this invention the cyclized rubbers are stabilized by the addition of a small percentage of stabilizer, as for example 1 to 5 per cent, based on the weight of the cyclized rubber employed. The cyclized rubber may be produced with any of the usual cyclizing agents, such as phenol sulfonic acid, hydrogen fluoride, tin tetrachloride, boron fluoride, chlorostannic acid, etc.

The stabilizers or photochemical inhibitors of the present invention are amides formed by the reaction of a carboxylic acid with a polyalkylene polyamine, with the elimination of water. One or more than one molecule of acid may be reacted with one mol of the amine to form a compound which acts as an inhibitor of deterioration. The following equation illustrates the formation of the amides of this invention

In the foregoing formulae, R is hydrogen, alkyl, alicyclic or aralkyl. It may also be a heterocyclic alicyclic substituent as in morpholine derivatives, or other equivalent neutral groups. $R_1$ is any of the same substituents as R though it is not necessarily the same as R in the same molecule. $R_2$ represents a straight or branched aliphatic radical as found in the fatty acids. This radical may contain substituents, such as hydroxyl as would be the case in ricinoleic acid. $R_2$ may be unsaturated as in oleic acid. It can be readily seen that the number of acids that may be used is considerable without departing from the spirit of the invention. The following examples illustrate the preparation of such amides.

Example 1

Fifty-seven and four tenths parts of stearic acid and 37.8 parts of tetraethylene pentamine were mixed and heated together in a suitable reactor equipped with a condenser and thermometer. At a temperature of 150° C. reaction is obvious. The temperature is raised to about 200° C. and maintained until no more water is obtained as a distillate. This requires about two hours. A quantitative yield of a waxy solid is obtained. It is believed to have the following formula:

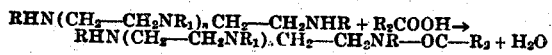

Example 2

The amide formed from equal molar proportions of abietic acid and tetraethylene pentamine was prepared by heating together methyl abietate and tetraethylene pentamine with the removal of methanol. Sixty-three and three tenths grams of methyl abietate and 37.8 of tetraethylene pentamine were heated for four hours at 200–215° C. or until no more methanol was given off or no further loss in weight of the reaction mixture was observed. The final product was a soft, amber-colored resin.

Example 3

Capric acid and tetraethylene pentamine readily react to form an amide by heating together the two materials. Fifty-one and six tenths parts of capric acid and 56.7 parts of tetraethylene pentamine were heated together at 180–200° C. for one and a half hours, when 5.1 g. of water was condensed. The product is a viscous liquid that deposits some crystals on standing. A quantitative yield was obtained.

Example 4

Two molar proportions of capric acid react with tetraethylene pentamine to give a diamide of the base. This material was prepared by heating together, as in the examples above, 113.2 parts of capric acid and 56.7 parts of tetraethylene pentamine. At 200° C. the calculated amount of water was formed, and the yield of diamide was theoretical. The product is a yellowish, crystalline mush.

Example 5

The amide from lauric acid and triethylene tetramine was prepared by heating these two materials together with the removal of water. Heating was continued for one and a half hours at 190–198° C. The product was made from 50.0 g. of lauric acid and 36.5 g. of triethylene tetramine and was obtained as a light-colored, low-melting solid in quantitative yield.

Example 6

Myristic acid, 68.4 g. was heated with triethylene tetramine, 43.8 g. for two hours at 180–197°

C. During the reaction 5.2 g. of water was obtained as a distillate in a heating time of two hours. The amide is a light, waxy solid.

Other acids may be used than those shown in the foregoing examples; among such would be isobutyric, hexoic, beta-ethyl hexoic, pelargonic, undecylenic, palmitic, oleic, hydroabietic, lactic, butoxy acetic, and phenoxy acetic acids.

Although ethylene amines have been disclosed specifically, it is possible to use propylene amines or mixed ethylene and propylene amines, etc. Such amines may be made from a mixture of alkylene halides and a mixture of ammonia and primary aliphatic amines. It is not necessary that all amine groups be unsubstituted as in the case, for example, of tetraethylene pentamine. Some must be unsubstituted for reaction with acids to form amides.

A coating composition of the following formula was prepared:

|  | Parts |
|---|---|
| Cyclized rubber | 20 |
| Paraffin wax (110-170° F.) | 3 |
| Stabilizer | 0.8 |
| Toluol | 76.2 |

The cyclized rubbers which are preferred for use in this example may have a distortion point of from 0-75° C. Such a coating composition gave a heat-sealable coating, and this coating agent was better than a similar coating containing no stabilizer. Spread on glassine paper to a dry weight of 2.5 to 3.0 pounds per 3,000 square feet, it gave a highly moisture-proof sheet which could be heat-sealed at a temperature of 250-350° F. The coating was dried by heating to 160-175° F. in an oven for 45 to 60 seconds.

Another formula which gave very satisfactory results is:

|  | Parts |
|---|---|
| Cyclized rubber (D. T. 0-75° C.) | 20 |
| Cumar (150° C. softening point) | 6 |
| Petrolatum | 3 |
| Paraffin (110-170° F.) | 3 |
| Stabilizer | 0.8 |
| Toluol | 67.2 |

This formula likewise gives a coating which is highly resistant to the transfer of moisture vapor, is heat-sealable even after the coated paper has stood exposed to the atmosphere for many months, and likewise the heat seal, after forming, maintains a firm bond after many months aging.

The cyclized rubber may, of course, be compounded with various plasticizers or stiffeners and a variety of waxes and waxy materials, etc., to produce a variety of moisture-proofing compositions.

What I claim is:

1. A composition which comprises a cyclized rubber and, as a stabilizer, a small percentage of an amide of a polyalkylene polyamine and a carboxylic acid of the class consisting of abietic acid, hydroabietic acid, and the aliphatic monocarboxylic acids.

2. A composition of matter which comprises a cyclized rubber and, as a stabilizer, a small percentage of an abietic acid amide of a polyalkylene polyamine.

3. A composition of matter which comprises a cyclized rubber and, as a stabilizer, a small percentage of an amide of tetraethylene pentamine and a carboxylic acid of the class consisting of abietic acid, hydroabietic acid, and the aliphatic monocarboxylic acids.

4. A wrapping material which comprises a flexible sheet material adapted for wrapping and a coating thereon which comprises a cyclized rubber and as a stabilizer therefor a small percentage of an amide of a polyalkylene polyamine and a carboxylic acid of the class consisting of abietic acid, hydroabietic acid, and the aliphatic monocarboxylic acids.

5. A composition of matter which comprises a cyclized rubber and, as a stabilizer, a small percentage of a hydroabietic-acid amide of a polyalkylene polyamine.

6. A composition of matter which comprises a cyclized rubber and, as a stabilizer, a small percentage of an amide of a polyalkylene polyamine and an aliphatic monocarboxylic acid.

CLARENCE M. CARSON.